No. 791,564. PATENTED JUNE 6, 1905.
O. LYNCH.
TIRE TIGHTENER.
APPLICATION FILED JAN. 13, 1905.
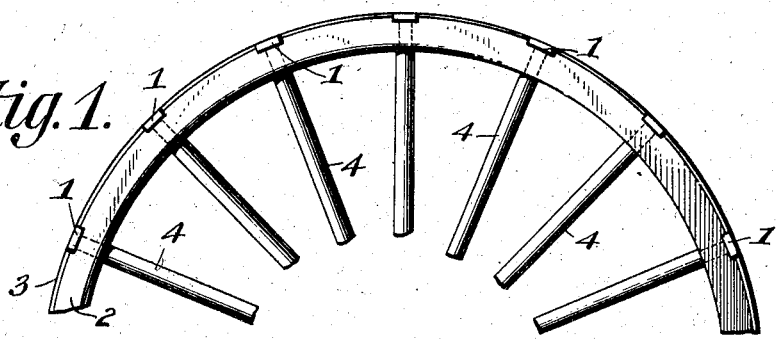
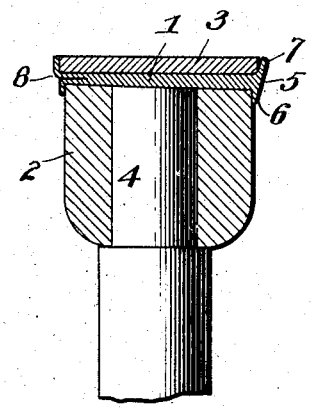
Oren Lynch, Inventor
Witnesses No. 791,564.

Patented June 6, 1905.

UNITED STATES PATENT OFFICE.

OREN LYNCH, OF RICHMOND, MISSOURI.

TIRE-TIGHTENER.

SPECIFICATION forming part of Letters Patent No. 791,564, dated June 6, 1905.

Application filed January 13, 1905. Serial No. 240,906.

*To all whom it may concern:*

Be it known that I, OREN LYNCH, a citizen of the United States, residing at Richmond, in the county of Ray and State of Missouri, have invented a new and useful Tire-Tightener, of which the following is a specification.

The invention relates to improvements in tire-tighteners.

The object of the present invention is to improve the construction of tire-tighteners and to provide a simple, inexpensive, and efficient device designed for use on various kinds of vehicle-wheels and adapted to be applied to the same by a person with little experience without liability of dishing a wheel.

A further object of the invention is to provide a tire-tightener of this character in the form of a wedge, which when driven in position will be securely held in place and which will present a neat appearance.

With these and other objects in view the invention consists in the construction and novel combination and arrangement of parts hereinafter fully described, illustrated in the accompanying drawings, and pointed out in the claim hereto appended, it being understood that various changes in the form, proportion, size, and minor details of construction within the scope of the claim may be resorted to without departing from the spirit or sacrificing any of the advantages of the invention.

In the drawings, Figure 1 is a side elevation of a portion of a wheel provided with tire-tighteners constructed in accordance with this invention. Fig. 2 is a transverse sectional view of the same, the spoke being shown in elevation. Fig. 3 is a detail perspective view of the tire-tightening wedge.

Like numerals of reference designate corresponding parts in all the figures of the drawings.

1 designates a wedge designed to be constructed of wrought-iron or other suitable material and consisting of a tapering body portion adapted to be interposed between the felly 2 of a wheel and the tire 3 thereof at the ends of the spokes 4, as clearly illustrated in Figs. 1 and 2 of the drawings. The tire-tightening wedge, which is designed for use on all kinds of vehicle-wheels, may be made of different thicknesses to suit the character of a wheel, and when the tire of the wheel is first tightened the wedge should be very thin and may be arranged at any desired intervals. However, the wedges should be located at diametrically opposite points. After the tire of a wheel has been once tightened either thicker wedges or a greater number of similar wedges may be employed. The wedge, which is adapted to be applied to a wheel by a person of little experience without danger of dishing the wheel, is provided at one end with a head 5, composed of inwardly and outwardly extending portions 6 and 7, adapted to engage the felly and the tire at the side of the wheel. The inwardly-extending portion 6 is provided with an inner face arranged substantially at right angles to the median line of the wedge and in a plane parallel with the side faces of the felly to fit the same snugly, as clearly shown in Fig. 2 of the drawings. The outwardly-extending portion is provided with an angularly-disposed inner face arranged at an obtuse angle to the median line of the wedge and adapted to accommodate itself to the tire, which in practice extends slightly beyond the side faces of the felly. Also the angularly-disposed outwardly-extending portion of the head is adapted to accommodate itself better to tires of different sizes than a projecting portion having an engaging face arranged in a plane parallel with that of the felly of a wheel. The other or small end 8 of the wedge is split longitudinally in a plane substantially parallel with the side faces of the wedge, and after the latter has been driven into position the split end is spread in opposite directions and clenched against the tire and the felly, as clearly shown in Fig. 2 of the drawings. When the wedge is clenched against the wheel, it is securely held in position, and it presents a neat appearance and can not accidentally become displaced.

It will be seen that the tire-tightener is exceedingly simple and inexpensive in construction, that it is adapted to be readily driven between the felly and the tire at the end of a spoke by an inexperienced person without liability of dishing a wheel. Also it will be clear that the head, which is provided at its inner and outer portions with faces arranged at different angles, is adapted to fit snugly against the felly and engage the projecting edge of a tire. Furthermore, it will be clear that the split end will not interfere with driving the wedge into a wheel and that it will enable the wedge to be positively held in place.

Having thus fully described my invention, what I claim as new, and desire to secure by Letters Patent, is—

A tire-tightener consisting of a wedge provided with a head having inwardly and outwardly projecting portions, the inwardly-extending portion being arranged to fit flat against the felly of a wheel, and the inner face of the outwardly-extending portion being arranged at an angle to that of the inwardly-extending portion, whereby it is adapted to engage the projecting portion of the tire.

In testimony that I claim the foregoing as my own I have hereto affixed my signature in the presence of two witnesses.

OREN LYNCH.

Witnesses:
 FRANK D. GARNER,
 CHRISTOPHER T. GARNER.